(12) United States Patent
Kurihara et al.

(10) Patent No.: US 7,210,349 B2
(45) Date of Patent: May 1, 2007

(54) DRIVE CIRCUIT OF OSCILLATION GYRO

(75) Inventors: Kazuo Kurihara, Saitama (JP); Yoshinori Satoh, Saitama (JP); Toshiyuki Kawamura, Miyagi (JP); Toru Matsunaga, Miyagi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/175,373

(22) Filed: Jul. 7, 2005

(65) Prior Publication Data

US 2006/0011000 A1  Jan. 19, 2006

(30) Foreign Application Priority Data

Jul. 14, 2004  (JP)  ............................ P2004-207026

(51) Int. Cl.
*G01P 9/04* (2006.01)
*G01C 19/00* (2006.01)

(52) U.S. Cl. ................................ 73/504.12; 73/504.14

(58) Field of Classification Search ............. 73/504.02, 73/504.04, 504.12, 504.13, 504.14, 504.15, 73/504.16; 310/316.01, 329, 321
See application file for complete search history.

(56) References Cited

U.S. PATENT DOCUMENTS

| | | | | |
|---|---|---|---|---|
| 5,902,931 A | * | 5/1999 | Mori et al. | ............... 73/504.12 |
| 6,016,699 A | * | 1/2000 | Kasanami et al. | ....... 73/504.14 |
| 6,049,157 A | | 4/2000 | Kobayashi | |
| 6,450,030 B1 | * | 9/2002 | Fujimoto | ................. 73/504.04 |
| 6,467,347 B1 | * | 10/2002 | Fujimoto | ................. 73/504.12 |
| 6,532,816 B2 | * | 3/2003 | Fujimoto | ................. 73/504.14 |
| 6,564,638 B1 | * | 5/2003 | Ebara | ...................... 73/504.14 |
| 6,584,842 B2 | * | 7/2003 | Fujimoto et al. | ........ 73/504.12 |
| 6,608,425 B2 | * | 8/2003 | Ebara et al. | ........... 310/316.01 |

FOREIGN PATENT DOCUMENTS

| | | |
|---|---|---|
| EP | 0 647 831 A1 | 4/1995 |
| JP | 08-054239 | 2/1996 |
| JP | 10-227643 | 8/1998 |
| JP | 11-094558 | 4/1999 |
| JP | 2000-304543 | 11/2000 |

OTHER PUBLICATIONS

Search and Examination Reports from Austrian Patent Office Service and Information Center for Application No. 200504213-0 dated Sep. 6, 2006.

* cited by examiner

*Primary Examiner*—Helen Kwok
(74) *Attorney, Agent, or Firm*—Rader Fishman & Grauer PLLC; Ronald P. Kananen

(57) ABSTRACT

The present invention provides a drive circuit of an oscillation gyro including two piezoelectric elements formed in an oscillator, which includes an adding circuit for supplying a drive signal to one side faces of the two piezoelectric elements and adding signals obtained from the other side faces opposed to the one side faces of the piezoelectric elements, and an oscillation circuit adapted to be fed back with an addition output signal obtained by the adding circuit, wherein a sine wave signal obtained as an oscillation output of the oscillation circuit is supplied to the one side faces of the two piezoelectric elements as the drive signal. Thus, the drive circuit of the oscillation gyro which obtains the stable output with the simple configuration can be provided.

7 Claims, 5 Drawing Sheets

US 7,210,349 B2

DRIVE CIRCUIT OF OSCILLATION GYRO

CROSS REFERENCES TO RELATED APPLICATIONS

The present invention contains subject matter related to Japanese Patent Application JP 2004-207026 filed in the Japanese Patent Office on Jul. 14, 2004, the entire contents of which are incorporated herein by reference.

BACKGROUND OF THE INVENTION

1. Field of the Invention

The present invention relates to a drive circuit of an oscillation gyro which includes two piezoelectric elements formed in an oscillator.

2. Description of Related Art

As a civilian gyro used for detection of an unintentional movement of the hands in taking an image when using a video camera, direction detection in a car navigation system, attitude control of a movable body, such as a vehicle, and the like, a columnar oscillation gyro utilizing a flexing oscillation has been used. For example, an oscillation gyro in which two piezoelectric elements are adhered to a quadrangular prism-like oscillator is put to practical use (for example, Patent Document 1: Japanese Patent Application Laid-Open Publication No. 2000-304543).

Heretofore, for example, as shown in FIG. 1, a drive circuit 20 drives an oscillation gyro 1 which includes a quadrangular prism-like oscillator 2, a piezoelectric element 3a and a piezoelectric element 3b, and is formed in such a manner that the piezoelectric element 3a and the piezoelectric element 3b are aligned on a first side face of the oscillator 2. The surface of the oscillator 2 is conductively plated. Then, a detection signal is outputted from outputs of the two piezoelectric elements 3a, 3b.

In the drive circuit 20 of the conventional oscillation gyro 1 shown in FIG. 1, a second side face opposed to a first side face of the oscillator 2 is connected to a reference potential Vref. This reference potential Vref is applied to a side face that is brought into contact with the oscillator 2 of the piezoelectric element 3a and the piezoelectric element 3b through the oscillator 2.

To the piezoelectric element 3a and the piezoelectric element 3b provided on the first side face of the oscillator 2, an adding circuit 22 and a differential amplifier 26 are respectively connected, and an oscillation circuit 24 is connected through resistors 21a, 21b and a capacitor 25. Also, the adding circuit 22 is connected to a comparing circuit 23, which is connected to the oscillation circuit 24.

The differential amplifier 26 is connected to a synchronous detector 27, and a detection signal Vsd' by this synchronous detector 27 is outputted as a detection signal through a DC amplifier 28.

In the drive circuit 20 of such a configuration, an output signal Vgo' of the oscillation circuit 24 is supplied to the side faces of the piezoelectric elements 3a, 3b, opposed to the other side faces of the piezoelectric elements 3a, 3b that abut on the oscillator 2, through the capacitor 25 and the resistors 21a, 21b.

An output signal Vgl' of the piezoelectric element 3a and an output signal Vgr' of the piezoelectric element 3b are added by the adding circuit 22, and its addition signal Vsa' is inputted to the comparing circuit 23. The comparing circuit 23 compares the addition signal Vsa' by the adding circuit 22 with the output signal Vgo' of the oscillation circuit 24 and supplies the comparison output signal Vcm' to the oscillation circuit 24. Also, a differential signal Vda' between the output signal Vgl' of the piezoelectric element 3a and the output signal Vgr' of the piezoelectric element 3b is outputted by the differential amplifier 26 and synchronously detected by the synchronous detector 27. The synchronous detector 27 synchronously detects the differential signal Vda' by using a clock signal Vck' formed by the oscillation circuit 24. A detection signal Vsd' by the synchronous detector 27 is amplified by the DC amplifier 28 and outputted as a detection signal.

FIG. 2 is a time chart of a voltage waveform in each portion of the drive circuit 20 of the conventional oscillation gyro 1 shown in FIG. 1. In FIG. 2, the case in which there is no rotation at a major axis of the oscillation gyro 1 as a center is expressed as a stationary state, and the case in which the rotation at the major axis as a center is applied is expressed as a state when a rotation angle velocity is applied.

An oscillation system is formed of a positive feedback loop including the oscillation gyro 1, the resistor 21a, the resistor 21b, the capacitor 25, the adding circuit 22, the comparing circuit 23 and the oscillation circuit 24, and it is self-oscillated in the resonance frequency of the oscillation gyro 1. The oscillation gyro 1 is flexingly oscillated in a direction perpendicular to the first side face and the second side face by this oscillation. When rotated at the major axis of the oscillation gyro 1 as a center, in this state, the direction of the flexing oscillation is changed by a Coriolis force. Thus, an output difference (Vgl'−Vgr') is generated between the piezoelectric element 3a and the piezoelectric element 3b, and a difference signal Vda' is obtained from the differential amplifier 26. At this time, signals for driving the oscillation gyro 1 are the outputs of the piezoelectric element 3a and the piezoelectric element 3b at a stationary state, and they are signals having the same phase and amplitude in the piezoelectric element 3a and the piezoelectric element 3b. Therefore, the signals for driving the oscillation gyro 1 are canceled by the differential amplifier 26. Then, the signals in response to the Coriolis force are the signals Vcl' and Vcr' of reverse phases and the same amplitude in the piezoelectric element 3a and the piezoelectric element 3b. Therefore, the difference signal Vda' obtained by the differential amplifier 26 is a signal proportional to (Vcl'−Vcr').

The difference signal Vda' obtained by the differential amplifier 26 is synchronously detected thereby to be converted into the DC detection signal Vsd'. The synchronous detector 27 full-wave rectifies the difference signal Vda' from the differential amplifier 26 at the timing of the clock signal Vck' thereby to convert the signal Vda' into the signal Vfr', and then it integrates the signal Vfr' to obtain the DC detection signal Vsd'. This detection signal Vsd' is DC amplified to a predetermined amplitude by the DC amplifier 28, and only an angular velocity signal generated by the rotation can be detected.

The signal in response to the Coriolis force is canceled in the addition signal Vsa' obtained by the adding circuit 22, and it becomes a signal proportional to the sum of the outputs of the piezoelectric element 3a and the piezoelectric element 3b at the stationary state. When Zgl is an impedance of the piezoelectric element 3a, Zgr is an impedance of the piezoelectric element 3b, Rb is a value of the resistor 21a and the resistor 21b, and 2·Rs is an input impedance of the adding circuit 22, the output signal Vgl' of the piezoelectric element 3a and the output signal Vgr' of the piezoelectric element 3b are shown as below.

$$Vgl'=[(Zgl/Rs)/\{(Zgl//Rs)+Rb\}] \cdot Vgo' = \{1/(1+Rb/Rs+Rb/Zgl)\} \cdot Vgo'$$

$$Vgr'=[(Zgr//Rs)/\{(Zrg//Rs)+Rb\}] \cdot Vgo' = \{1/(1+Rb/Rs+Rb/Zgr)\} \cdot Vgo'$$

Since the impedance Zgl of the piezoelectric element 3a and the impedance Zgr of the piezoelectric element 3b become the minimum when the oscillation gyro 1 oscillates in the resonance frequency, the voltage amplitudes of the output signal Vgl' of the piezoelectric element 3a and the output signal Vgr' of the piezoelectric element 3b become also the minimum. Therefore, the voltage amplitude of the addition signal Vsa' obtained by the adding circuit 22 becomes the minimum. When the addition signal Vsa' of the adding circuit 22 is compared with the output signal Vgo' of the oscillation circuit 24, in a comparison output signal Vcm' of the comparing circuit 23, the voltage amplitude becomes the maximum when the oscillation circuit 24 oscillates in the resonance frequency, becoming the positive feedback loop for forming the oscillation system. The comparison output signal Vcm' of the comparing circuit 23 is a signal proportional to (Vgo'−Vsa'). Since the signal Vcm' is distorted in waveform, the signal Vcm' is waveform shaped to a triangular wave by the oscillation circuit 24 and outputted as an output signal Vgo'.

Since the DC bias voltage of the signal Vgo' is cut in the conventional drive circuit 20, the capacitor 25 is necessary. If the capacitor 25 is not included, the DC bias voltage of the signal Vgo' is inputted to the comparing circuit 23 through the adding circuit 22, and the DC bias voltages become the same values at the two input terminals of the comparing circuit 23. Then, the output signal Vgo' of the oscillation circuit 24 is saturated, and hence it is not oscillated.

SUMMARY OF THE INVENTION

Since the oscillation gyro 1 heretofore known as described above uses the piezoelectric element 3a and the piezoelectric element 3b commonly for a drive piece and a detection piece, it can be formed in a very simple structure. However, there exists a problem that the drive circuit for driving the oscillation gyro 1 is complicated and difficult to realize at a low cost.

Accordingly, in view of the above-mentioned conventional problem it is desirable to provide a drive circuit of an oscillation gyro which has a simple configuration and a reduced cost.

Further, another object of the present invention and concrete advantages obtained according to the present invention will be further clarified from the description of embodiment that will be described below.

More particularly, according to the present invention, a drive circuit of an oscillation gyro including two piezoelectric elements formed in an oscillator comprises an adding circuit for supplying a drive signal to one side faces of the two piezoelectric elements and adding signals obtained from the other side faces opposed to the one side faces of the piezoelectric elements and an oscillation circuit adapted to be fed back with an addition output signal obtained by the adding circuit, wherein a sine wave signal obtained as an oscillation output of the oscillation circuit is supplied to the one side faces of the two piezoelectric elements as the drive signal.

According to the present invention, the configuration can be simplified and the cost can be reduced by inputting the drive signal to the one side faces of the two piezoelectric elements formed in the oscillator of the oscillation gyro, inputting signals outputted from the other side faces opposed to the above-mentioned one side faces to the adding circuit, inputting the output signal of the adding circuit to the oscillation circuit, and supplying a sine wave signal obtained as the oscillation output of the oscillation circuit as the drive signal to the one side faces of the two piezoelectric elements.

DETAILED DESCRIPTION OF THE PREFERRED EMBODIMENTS

An embodiment of the present invention will be described in detail with reference to the accompanying drawings. The present invention is not limited to the embodiment described below, and may be changed arbitrarily within the scope of a range not departing from the subject matter of the present invention.

Figure 3:
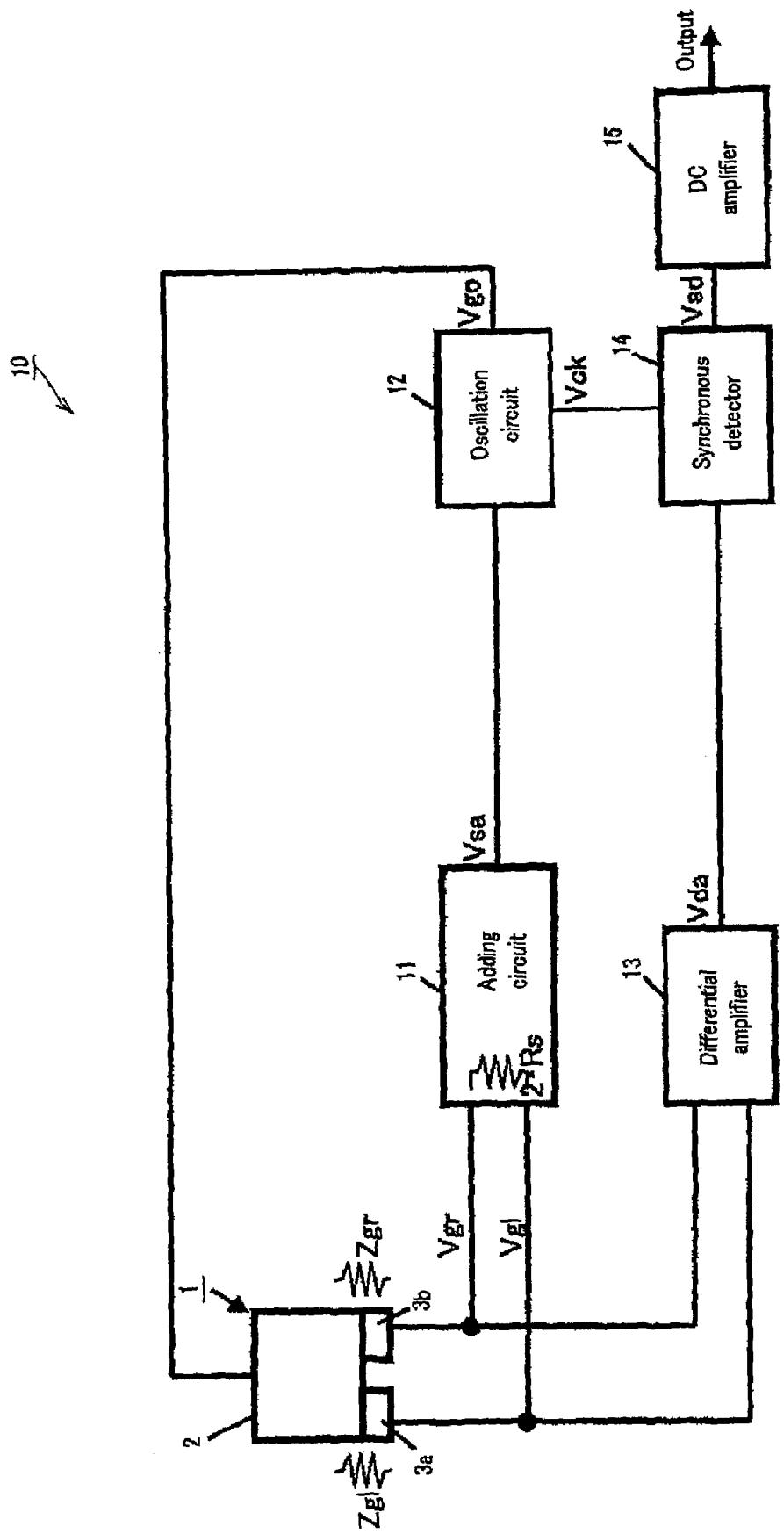
FIG. 3 is a block diagram showing a configuration example of a drive circuit of an oscillation gyro according to the present invention.

In the present invention, the oscillation gyro 1 is driven by the drive circuit 10 having a configuration, for example, as shown in FIG. 3.

Figure 4:
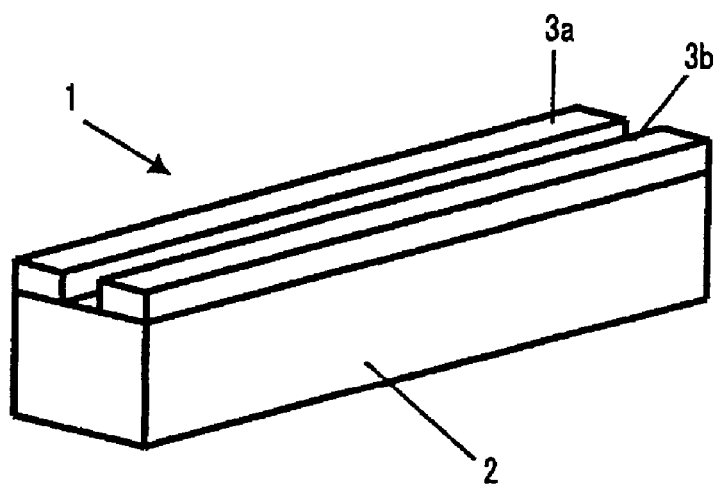
FIG. 4 is a perspective view of the oscillation gyro.
Figure 5:
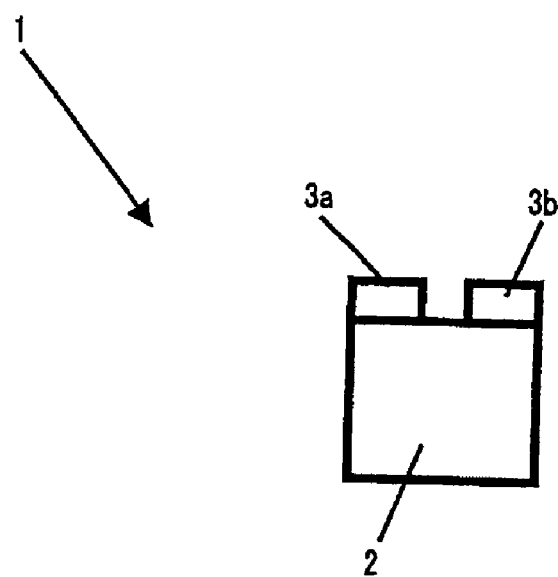
FIG. 5 is a side view of the oscillation gyro.

This oscillation gyro 1 comprises a quadrangular prism-like oscillator 2, a piezoelectric element 3a and a piezoelectric element 3b in such a manner that the piezoelectric element 3a and the piezoelectric element 3b are aligned on a first side face of the oscillator 2, as shown in FIG. 4 and FIG. 5. The surface of the oscillator 2 is conductively plated. The oscillator 2 is generally formed of a material for generating a mechanical vibration, such as Elinvar, iron-nickel, quartz, glass, crystal, ceramics, etc.

The drive circuit 10 for driving the oscillation gyro 1 comprises an adding circuit 11 for supplying a drive signal to one side faces of the two piezoelectric elements 3a, 3b and adding signals obtained from the other side faces opposed to the one side faces of the piezoelectric elements 3a, 3b and an oscillation circuit 12 adapted to be fed back with an addition output signal obtained by the adding circuit 11, wherein a sine wave signal obtained as an oscillation output of the oscillation circuit 12 is supplied to the one side faces of the two piezoelectric elements 3a, 3b as the drive signal. A differential amplifier 13 is connected together with the adding circuit 11 to the piezoelectric element 3a and the piezoelectric element 3b provided on the first side face of the oscillator 2; a difference signal Vda obtained by a differential amplifier 13 is synchronously detected by a synchronous detector 14; and a detection signal Vsd is outputted as the detection signal through a DC amplifier 15.

More particularly, the oscillation gyro 1 has the piezoelectric element 3a and the piezoelectric element 3b formed to be aligned on the first side face of the oscillator 2, and the output signal Vgo of the oscillation circuit 12 is inputted to a second side face opposed to the first side face of the oscillator 2. The signal Vgo is applied to the side faces of the piezoelectric element 3a and the piezoelectric element 3b that abuts on the oscillator 2 through the oscillator 2. An output signal Vgl of the piezoelectric element 3a and an output signal Vgr of the piezoelectric element 3b outputted from the side faces opposed to the side faces that abuts on the oscillator 2 are inputted to the adding circuit 11. An addition output signal Vsa of the adding circuit 11 is inputted to the oscillation circuit 12. Also, the output signal Vgl of the piezoelectric element 3a and the output signal Vgr of the piezoelectric element 3b are inputted to the differential amplifier 13. An output Vda of the differential amplifier 13 is synchronously detected by the synchronous detector 14, but its timing is conducted by using a clock signal Vck formed in the oscillation circuit 12. An output signal Vsd of the synchronous detector 14 is amplified by the DC amplifier 15.

Figure 6:
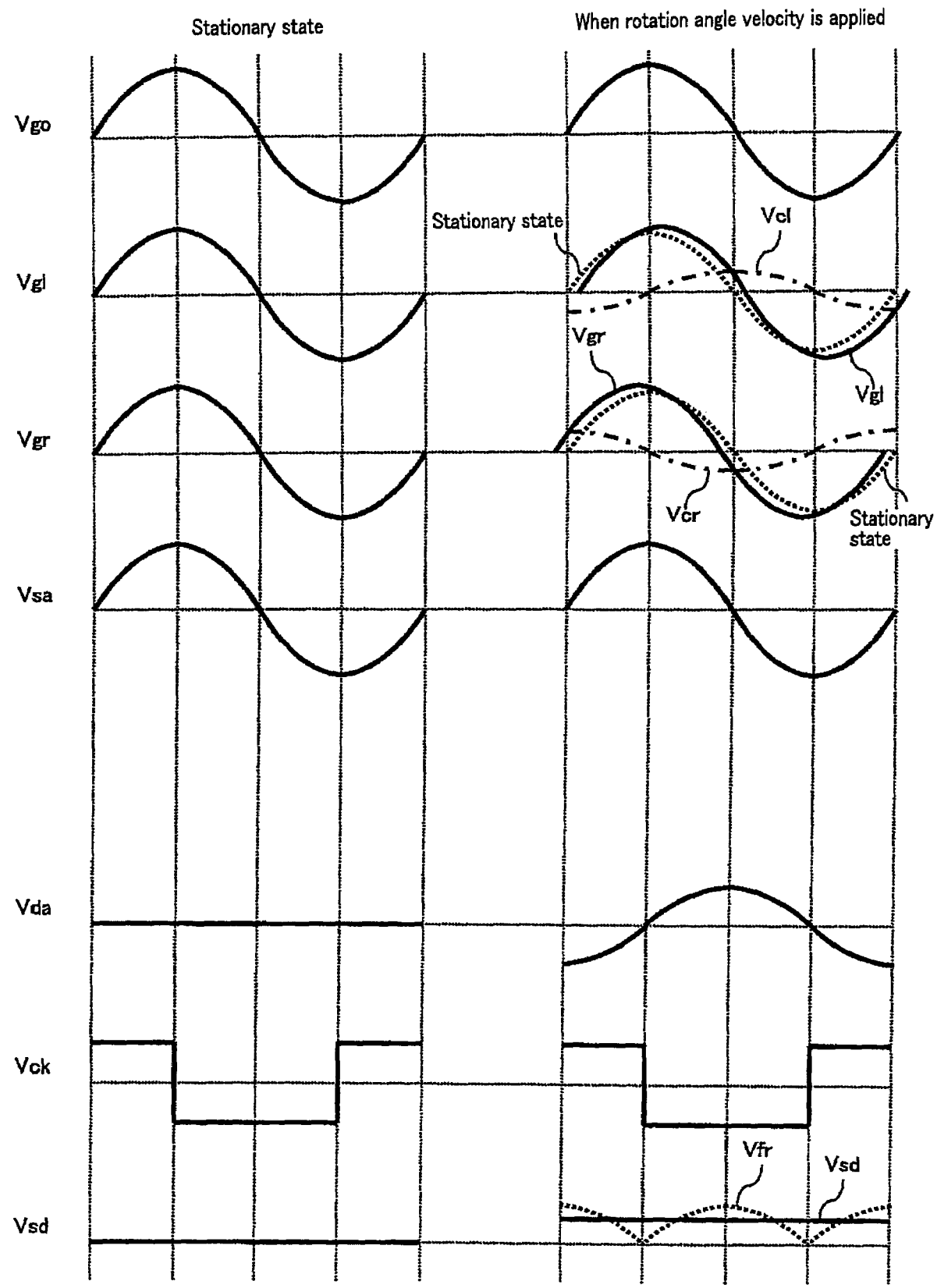
FIG. 6 is a time chart of voltage waveforms in respective portions of the drive circuit of the oscillation gyro.

FIG. 6 is a time chart of a voltage waveform in each portion of the drive circuit 10 for driving the oscillation gyro 1 shown in FIG. 3. The casein which there is no rotation at a major axis of the oscillation gyro 1 as a center is expressed as a stationary state, and in which case that the rotation at the major axis as a center is applied, is expressed as a state when a rotation angle velocity is applied.

An oscillation system is formed of a positive feedback loop including the oscillation gyro 1, the adding circuit 11 and the oscillation circuit 12, and it is self-oscillated in the resonance frequency of the oscillation gyro 1. The oscillation gyro 1 is flexingly oscillated in a direction perpendicular to the first side face and the second side face by this oscillation. When rotated, at the major axis of the oscillation gyro 1 as a center, in this state, the direction of the flexing oscillation is changed by the Coriolis force. Thus, an output difference (Vgl−Vgr) is generated between the piezoelectric element 3a and the piezoelectric element 3b, and an output Vda is obtained from the differential amplifier 13. At this time, the signals for driving the oscillation gyro 1 are the outputs of the piezoelectric element 3a and the piezoelectric element 3b at the stationary state, and they are the signals having the same phase and amplitude in the piezoelectric element 3a and the piezoelectric element 3b. Therefore, the signals for driving the oscillation gyro 1 are canceled by the differential amplifier 13. Then, the signals in response to the Coriolis force are the signal Vcl and the signal Vcr of reverse phases and the same amplitude in the piezoelectric element 3a and the piezoelectric element 3b. Therefore, the difference signal Vda obtained by the differential amplifier 13 is a signal proportional to (Vgl−Vgr).

The difference signal Vda obtained by the differential amplifier 13 is synchronously detected by the synchronous detector 14 and is thereby converted into the DC signal Vsd. The synchronous detector 14 full-wave rectifies the difference signal Vda supplied from the differential amplifier 13 at the timing of the clock signal Vck, thereby to convert the difference signal Vda into the signal Vfr, and then integrates the signal Vfr to obtain the DC signal Vsd. This signal Vsd is DC amplified to a predetermined amplitude by the DC amplifier 15, and only an angular velocity signal generated by the rotation can be detected.

The signal in response to the Coriolis force is canceled in the addition output signal Vsa of the adding circuit 11, and becomes a signal proportional to the sum of the outputs of the piezoelectric element 3a and the piezoelectric element 3b at the stationary state. When Zgl is an impedance of the piezoelectric element 3a, Zgr is an impedance of the piezoelectric element 3b and 2·Rs is an input impedance of the adding circuit 11, the output Vgl of the piezoelectric element 3a and the output Vgr of the piezoelectric element 3b are shown as below.

$Vgl=\{Rs/(Zgl+Rs)\} \cdot Vgo=\{1/(1+Zgl/Rs)\} \cdot Vgo$ $Vgr=\{Rs/(Zgr+Rs)\} \cdot Vgo=\{1/(1+Zgr/Rs)\} \cdot Vgo$ Since the impedance Zgl of the piezoelectric element 3a and the impedance Zgr of the piezoelectric element 3b become the minimum when the oscillation gyro 1 oscillates in the resonance frequency, the voltage amplitudes of the output Vgl of the piezoelectric element 3a and the output Vgr of the piezoelectric element 3b become the maximum. Therefore, the voltage amplitude of the addition output signal Vsa of the adding circuit 11 becomes the maximum, functioning as the positive feedback loop for forming the oscillation system. Furthermore, the amplification degree of this signal is regulated by the oscillation circuit 12, and thus, the oscillation circuit 12 oscillates as a sine wave signal and its output signal Vgo becomes a sine wave signal.

Figure 1:
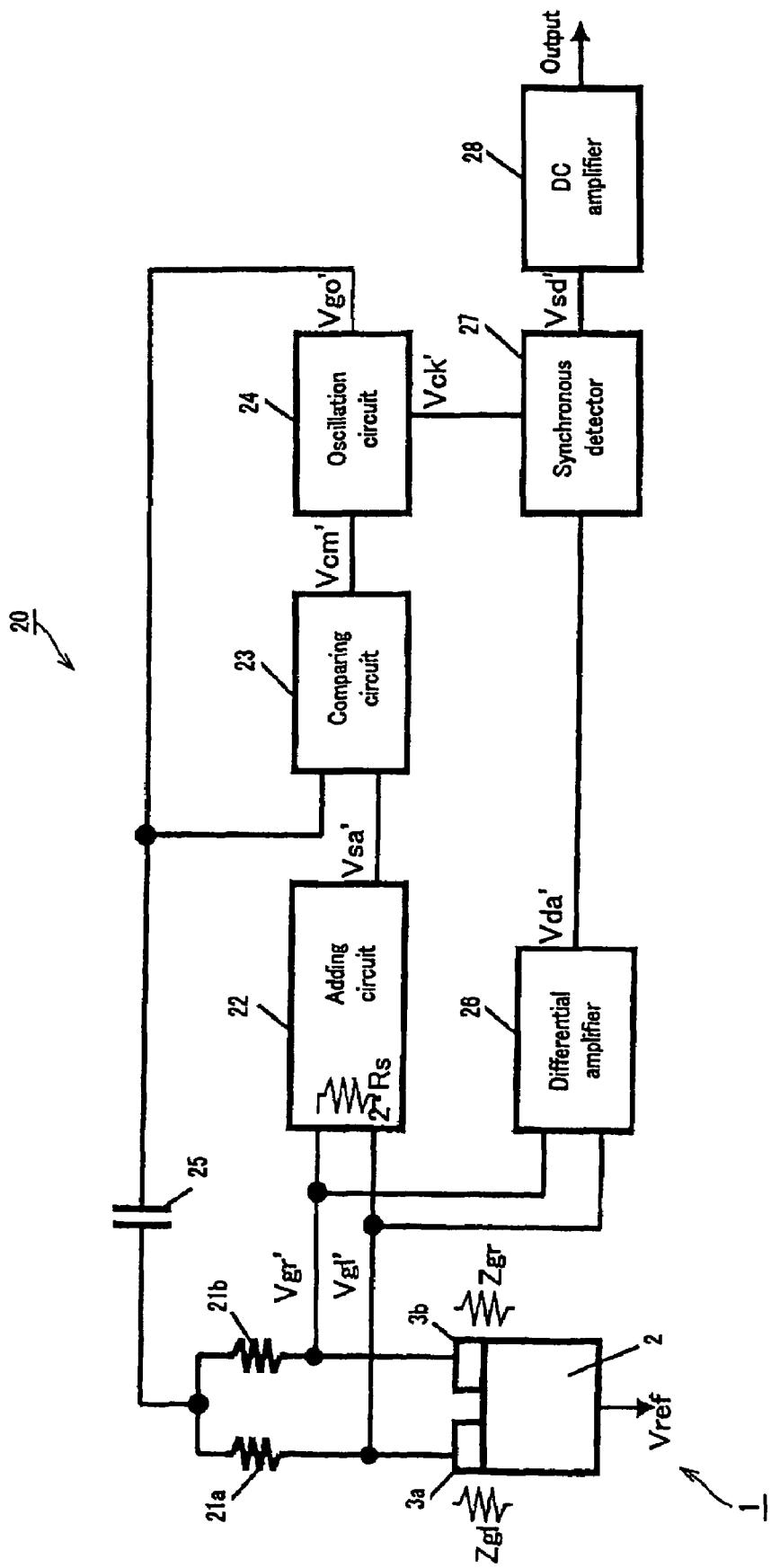
FIG. 1 is a block diagram showing a configuration example of a drive circuit of a conventional oscillation gyro.
Figure 2:
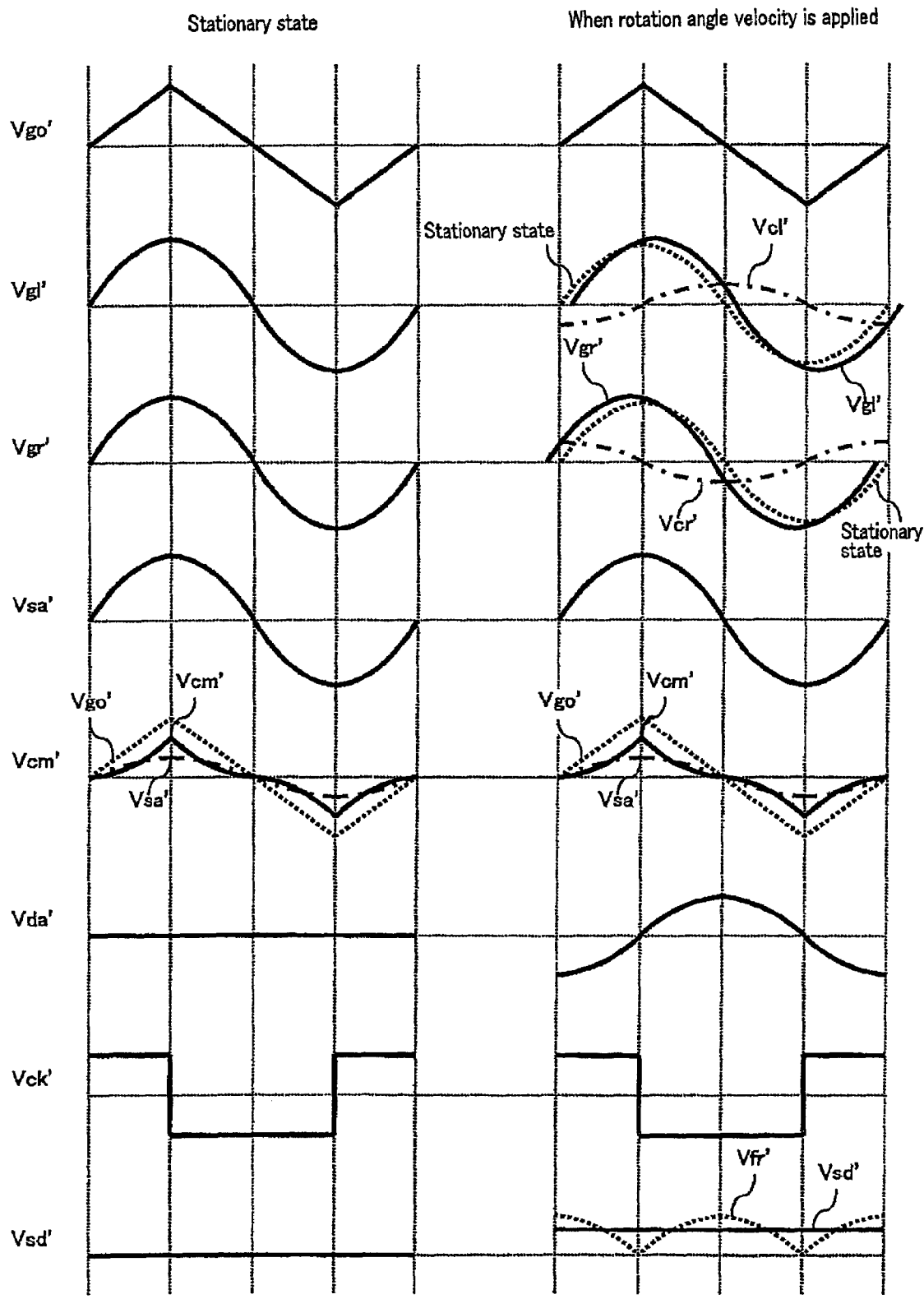
FIG. 2 is a time chart diagram of voltage waveforms in respective portions of the drive circuit of the conventional oscillation gyro.

In the drive circuit 20 of the conventional oscillation gyro 1 shown in FIG. 1, the resistor 21a, the resistor 21b, the capacitor 25, and the comparing circuit 23 are required. Further, the waveform is reshaped to a triangular wave in the oscillation circuit 24. On the other hand, according to the present invention, in the drive circuit 10 of the oscillation gyro 1 shown in FIG. 3, components corresponding to the resistor 21a, the resistor 21b, the capacitor 25, and the comparing circuit 23 are not required functionally. In addition, the waveform shaping in the oscillation circuit 24 is not required. Therefore, the oscillation gyro 1 is driven by the drive circuit 10, which is very simplified, and the gyro output can be detected.

It should be understood by those skilled in the art that various modifications, combinations, sub-combinations and alterations may occur depending on design requirements and other factors insofar as they are within the scope of the appended claims or the equivalents thereof.

What is claimed is:

1. A drive circuit of an oscillation gyro including two piezoelectric elements formed on a single side face of a quadrangular prism-like oscillator, each of the two piezoelectric elements including side faces, comprising:

an adding circuit for supplying a drive signal to one of the side faces of the two piezoelectric elements and adding signals obtained from the other of the side faces opposed to the one of the side faces of the piezoelectric elements; and an oscillation circuit adapted to be fed back with an addition output signal obtained by the adding circuit, wherein a sine wave signal obtained as an oscillation output of the oscillation circuit is supplied to the one of the side faces of the two piezoelectric elements as the drive signal.

2. The drive circuit of the oscillation gyro according to claim 1, wherein a front surface of the oscillator is conductively plated.

3. The drive circuit of the oscillation gyro according to claim 1 wherein said oscillator is formed of a material for generating a mechanical vibration.

4. A drive circuit of an oscillation gyro, comprising two piezoelectric elements aligned on a first side face of a quadrangular prism-like oscillator, each of the two piezoelectric elements including side faces;

an adding circuit for supplying a drive signal to one of the side faces of the two piezoelectric elements and adding signals obtained from the other of the side faces opposed to the one of the side faces of the piezoelectric elements; and an oscillation circuit adapted to be fed back with an addition output signal obtained by the adding circuit, wherein a sine wave signal obtained as an oscillation output of the oscillation circuit is supplied to the one of the side faces of the two piezoelectric elements as the drive signal.

5. The drive circuit of the oscillation gyro according to claim 4, wherein a front surface of the oscillator is conductively plated.

6. The drive circuit of the oscillation gyro according to claim 4 wherein said oscillator is formed of a material for generating a mechanical vibration.

7. The drive circuit of the oscillation gyro according to claim 4 further including a differential amplifier connected together with the adding circuit to the two piezoelectric elements provided on the first side face of the oscillator, a difference signal from the differential amplifier being synchronously detected by a synchronous detector to provide a detection signal.

* * * * *